United States Patent
Hammad et al.

(10) Patent No.: US 11,120,259 B2
(45) Date of Patent: Sep. 14, 2021

(54) METHOD AND SYSTEM FOR LAND ENCROACHMENT DETECTION AND SURVEILLANCE

(71) Applicant: Saudi Arabian Oil Company, Dhahran (SA)

(72) Inventors: Ali H Hammad, Saihat (SA); Sekar Arunachalam, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 78 days.

(21) Appl. No.: 16/533,033

(22) Filed: Aug. 6, 2019

(65) Prior Publication Data
US 2021/0042499 A1 Feb. 11, 2021

(51) Int. Cl.
G06K 9/00 (2006.01)
G06K 9/62 (2006.01)
G08B 21/18 (2006.01)

(52) U.S. Cl.
CPC ....... *G06K 9/0063* (2013.01); *G06K 9/00771* (2013.01); *G06K 9/6202* (2013.01); *G06K 9/6256* (2013.01); *G06K 9/6268* (2013.01); *G08B 21/18* (2013.01)

(58) Field of Classification Search
CPC .. G06K 9/0063; G06K 9/6202; G06K 9/6268; G06K 9/00771; G06K 9/6256; G08B 21/18
See application file for complete search history.

(56) References Cited

U.S. PATENT DOCUMENTS

| | | | |
|---|---|---|---|
| 8,908,919 B2 | 12/2014 | Walton et al. | |
| 9,948,902 B1* | 4/2018 | Trundle | H04N 7/183 |
| 2008/0192118 A1* | 8/2008 | Rimbold | H04N 5/232 348/159 |
| 2010/0283662 A1* | 11/2010 | Fox | G01S 7/2922 342/53 |
| 2017/0330059 A1* | 11/2017 | Novotny | G06K 9/00664 |

(Continued)

FOREIGN PATENT DOCUMENTS

CN 108154199 * 12/2017 ............... G06K 9/66

OTHER PUBLICATIONS

Anantharaman Rajaram, "Utilizing Mask R-CNN for Detection and Segmentation of Oral Diseases", pp. 2197-2198 (Year: 2018).*

(Continued)

*Primary Examiner* — Sumati Lefkowitz
*Assistant Examiner* — Dalen O Goodson
(74) *Attorney, Agent, or Firm* — Leason Ellis LLP

(57) ABSTRACT

A system, a method, and a computer program for surveillance and area encroachment detection, including receiving satellite image data containing an image of a geospatial area, extracting features from the satellite image data of an object in the image, classifying the object in the image based on the extracted features, comparing the extracted features of the object to previously extracted features for the geospatial area, determining delta features between the extracted features of the object and the previously extracted features for the geospatial area, determining existence of an alarm event in the geospatial area based on the delta features, and transmitting an alarm event message to a communicating device.

23 Claims, 6 Drawing Sheets

(56) References Cited

U.S. PATENT DOCUMENTS

2019/0050625 A1    2/2019   Reinstein et al.

OTHER PUBLICATIONS

Ji, Shunping, et al. "Building instance change detection from large-scale aerial images using convolutional neural networks and simulated samples." Remote Sensing 11.11 (2019): 1343. 20 pages.
International Search Report and Written Opinion in Corresponding PCT Application No. PCT/US2020/044963 dated Oct. 15, 2020. 9 pages.
PlanetWatchers website: https://www.planetwatchers.com/.
Matija Radovic, et al., "Object Recognition in Aerial Images Using Convolutional Neural networks," J. of Imaging 2017, vol. 3, p. 21.
Ajay Kushwaha, et al., "Theft Detection using Machine Learning," IOSR J. of Engineering, vol. 8, pp. 67-71.
Antonio-Javier Gallego, et al., "Automatic Ship Classification from Optical Aerial Images with Convolutional Neural Networks," Remote Sens. 2018, vol. 10, p. 511.
Bharath Raj, "How to Automate Surveillance Easily with Deep Learning," published on Aug. 3, 2018 at https://medium.com/nanonets/how-to-automate-surveillance-easily-with-deep-learning-4eb4fa0cd68d.

* cited by examiner

METHOD AND SYSTEM FOR LAND ENCROACHMENT DETECTION AND SURVEILLANCE

TECHNOLOGICAL FIELD OF THE DISCLOSURE

The present disclosure relates to a system, method, and computer program for surveillance and for detecting land encroachment and asset vandalism.

SUMMARY OF THE DISCLOSURE

According to a non-limiting embodiment of the disclosure, a method is provided for surveillance and area encroachment detection. The method comprises receiving satellite image data containing an image of a geospatial area, extracting features from the satellite image data of an object in the image, classifying the object in the image based on the extracted features, comparing the extracted features of the object to previously extracted features for the geospatial area; determining delta features between the extracted features of the object and the previously extracted features for the geospatial area, determining existence of an alarm event in the geospatial area based on the delta features, and transmitting an alarm event message to a communicating device. The method can further comprise receiving the previously extracted features for the geospatial area from a storage containing geographic information system data. The method can further comprise receiving a training dataset for the geospatial area and supplying the training dataset to a deep learning neural network to train the deep learning neural network to determine the existence of the object in the geospatial area.

The alarm event can comprise an encroachment in the geospatial area.

The alarm event can comprise an encroachment in a zone in the geospatial area.

The alarm event can comprise adding or appearance of the object in the geospatial area.

The alarm event can comprise removal of the object from the geospatial area.

The alarm event can comprise a change to an attribute of the object.

According to another non-limiting embodiment of the disclosure, a system is provided for surveillance and area encroachment detection. The system comprises an image data interface that receives satellite image data for an image of a geospatial area; an image processor having a deep neural network that extracts features from the satellite image data of an object in the image, classifies the object in the image based on the extracted features, compares the extracted features of the object to previously extracted features for the geospatial area, determines delta features between the extracted features of the object and the previously extracted features for the geospatial area, and detects an alarm event in the geospatial area based on the delta features; and, an area encroachment detection and surveillance unit that transmits an alarm event message to a communicating device based on the detected alarm event.

The image processor can comprise an object detector, a semantic segmentor, and an instance segmentor to compare extracted objects and their attributes at different times.

The object detector can predict the object in the geospatial area. The object detector can determine a bounding box and a probability score that the bounding box includes the object.

The semantic segmentor can associate each pixel in the satellite image data with a classification label.

The instance segmentor can comprise a Mask-RCNN. The instance segmentor can mark out each object instance in the satellite image data.

According to another non-limiting embodiment of the disclosure, a non-transitory computer readable storage medium storing surveillance and area encroachment detection program instructions is provided for causing an area encroachment and surveillance apparatus to analyze satellite image data and detect an alarm event. The program instructions comprise the steps of receiving satellite image data containing an image of a geospatial area, extracting features from the satellite image data of an object in the image, classifying the object in the image based on the extracted features, comparing the extracted features of the object to previously extracted features for the geospatial area, determining delta features between the extracted features of the object and the previously extracted features for the geospatial area, determining existence of an alarm event in the geospatial area based on the delta features, and transmitting an alarm event message to a communicating device. The program instructions can comprise the further steps of receiving a training dataset for the geospatial area and supplying the training dataset to a deep learning neural network to train the deep learning neural network to determine the existence of the alarm event in the geospatial area. The program instructions can comprise the further step of receiving the previously extracted features for the geospatial area from a storage containing geographic information system data.

The alarm event can comprise an encroachment in the geospatial area, an introduction or appearance of an object in the geospatial area, a change in the attributes of an object in the geospatial area, an encroachment in a zone in the geospatial area, or removal of the object from the geospatial area.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

Figure 1:
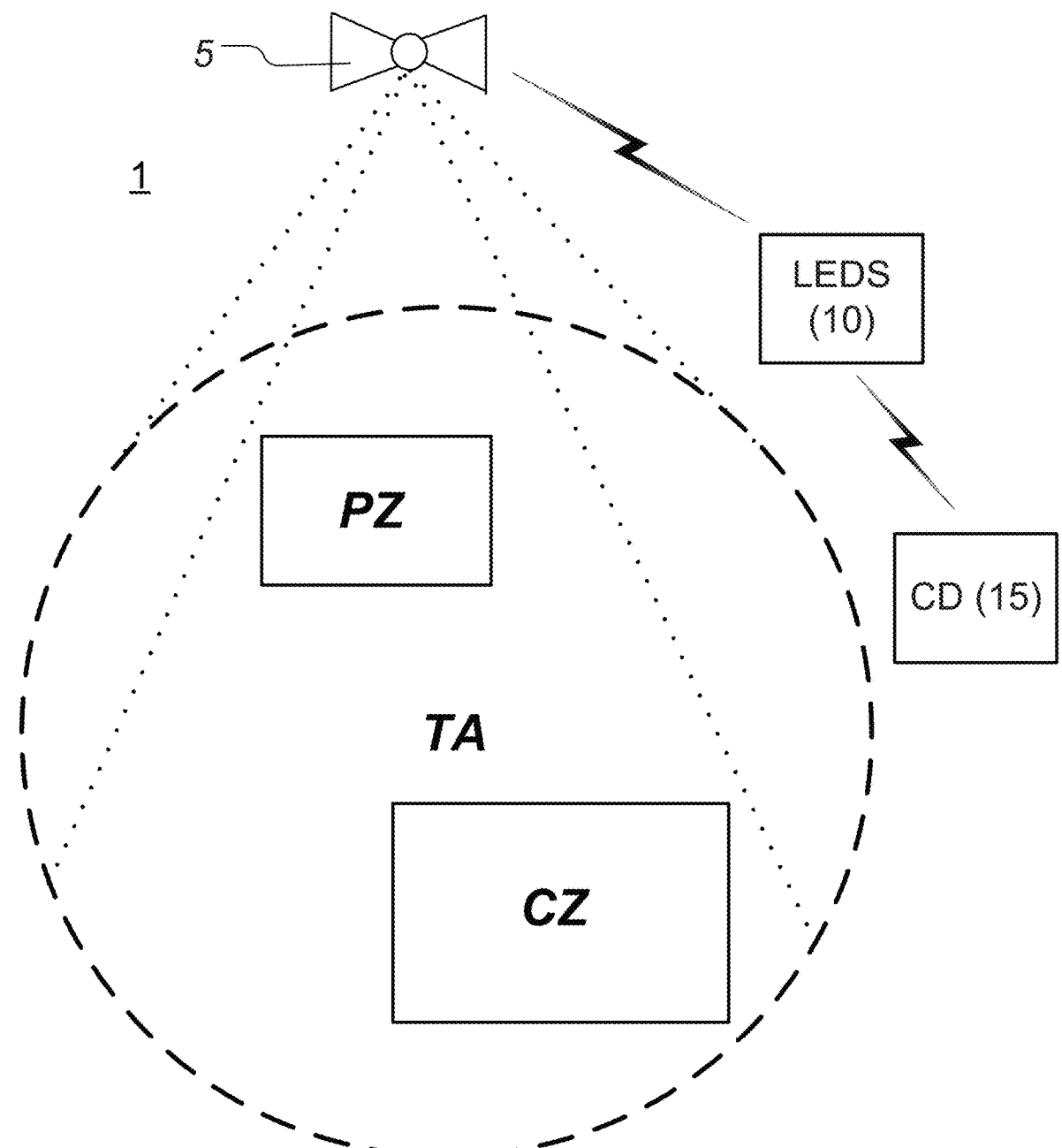
FIG. 1 shows an example of a land encroachment detection and surveillance (LEDS) solution in an environment.

The present disclosure is further described in the detailed description that follows.

DETAILED DESCRIPTION OF THE DISCLOSURE

The disclosure and its various features and advantageous details are explained more fully with reference to the non-limiting embodiments and examples that are described or illustrated in the accompanying drawings and detailed in the following description. It should be noted that features illustrated in the drawings are not necessarily drawn to scale, and features of one embodiment may be employed with other embodiments as those skilled in the art would recognize, even if not explicitly stated. Descriptions of well-known components and processing techniques may be omitted so as to not unnecessarily obscure the embodiments of the disclosure. The examples are intended merely to facilitate an understanding of ways in which the disclosure may be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

The field of artificial intelligence (AI) has made rapid progress in recent years, especially with respect to computer vision and natural language processing. Computer vision generally is an interdisciplinary scientific field that deals with how computers can gain a high-level understanding from digital images or videos. From the perspective of engineering, it seeks to automate tasks that can be done with the human visual system.

Deep learning is a subfield of AI that differs from traditional machine learning techniques. Deep learning can automatically extract features from image data and learn representations in a hierarchical structure. Recent breakthroughs in deep learning have occurred due to advancements in hardware, such as, for example, graphical processing units, availability of large amounts of data, and developments in collaborative community-based software algorithms. Achievements in deep learning-based techniques in computer vision have produced remarkable results in fields such as, for example, medical diagnostics, driverless cars, precision agriculture, and natural disaster preparedness and assessment. Large scale datasets are pre-requisites for successful application of deep learning.

The instant disclosure provides a land encroachment detection and surveillance (LEDS) solution that includes deep learning to process and analyze aerial image data to detect land encroachments and perform surveillance of geospatial areas. The aerial image data can include satellite image data or image data captured from aerial vehicles, such as, for example, aircraft, hovercraft, helicopters, unmanned aerial vehicles (UAVs), drones or any other technology that can capture high resolution images of geospatial areas from above the earth's surface. The image data can include time-dependent image data that allows visibility into how geospatial areas, or objects in those geospatial, areas might change with respect to time. The LEDS solution can process and analyze image data to detect land encroachments in geospatial areas, or perform surveillance of geospatial areas. For instance, the LEDS solution can detect small objects over large swaths of land, as well as detect and monitor any changes that might occur to an object or an object's location in the geospatial area over time. The LEDS solution includes, among other things, geospatial area selection and targeting, object detection, semantic segmentation, instance segmentation, object identification, object classification, object tracking and monitoring, land encroachment detection, and surveillance.

The LEDS solution can include a large-scale land encroachment detection system that provides a solution to the problem currently plaguing entities that own, manage, maintain, or service large geographical areas or equipment, supplies or other assets spread over large geographical areas, including land, water or sea. Presently, those entities typically rely on analyst-based solutions to detect trespassing, encroachment, theft or destruction of assets. Such solutions generally involve grueling analysis of high-resolution satellite images by trained analysists who must study and identify objects on the ground to determine land encroachment, trespass, theft or destruction of assets. The process is tedious, time consuming, and costly in terms of manpower and resources, since the images must be color-balanced and mosaic filtered before analysis can be done by the human analysts, and then grueling studied by the analysists. Such processes can take, for example, around three months from initial acquisition of the satellite image data until completion of the analysis by human analysts. Since the analysis is conducted by human analysts, the analysis can miss important events, and the results of the analysis can be too late to exercise remediation steps or take preventive action.

The LEDS solution provided in the instant disclosure overcomes such problems and many others that are currently plaguing those entities. The LEDS solution includes a land encroachment detection and surveillance (LEDS) system that uses deep learning to process and analyze high-resolution aerial (HRA) or very high resolution (VHR) image data and accurately extract and identify features or objects in near-real time. The LEDS system can monitor geospatial areas and detect trespassing, encroachment, or theft or destruction of objects over large geographic areas in near-real time. The objects can include, for example, landforms, land formations, structures, buildings, pipelines, roadways, bridges, railway tracks, vehicles, vessels, aircraft, watercraft, equipment, machinery, supplies, persons, animals, or any naturally occurring or manufactured article that can be located in a geospatial area.

FIG. 1 shows a non-limiting example of the LEDS solution in an environment 1, according to the principles of the disclosure. The environment 1 can include an aerial image source 5, a geospatial target area (TA) that can be defined by a geographic boundary and that is imaged by an image capture device (not shown) that can be included in the aerial image source 5, and a LEDS system 10. The target area TA can be divided into one or more zones, such as, for example, a critical zone (CZ) and a permissive zone (PZ). The critical zone CZ can include, for example, an area in a corporate campus that includes highly protected objects. Meanwhile, the permissive zone PZ can include an area in the corporate campus that is frequented by third parties or the public. Depending on the location of an object in the target area TA, or any changes to the object or the object's location or position, the event can be weighted differently. For instance, if an object (e.g., a person) appears in the critical zone at a time when the object is not expected (or predicted) to appear, an alarm event may be determined. However, if the same object appears in the permissive zone at a time that is within, for example, normal visiting hours, an alarm event will not be determined. The critical zone CZ and permissive zone PZ can be automatically determined over time by the LEDS system 10 by, for example, identifying objects in the target area TA and learning patterns over time relating to the location, position, characteristics, appearance, or any other attributes of the identified objects, as well as their interactions in the target area TA.

The LEDS system 10 can receive image data containing HRA or VHR image data from the aerial image source 5, including image data for the target area TA. The aerial image source 5 can include an aerial vehicle, such as, for example, a satellite, an aircraft, a hovercraft, a helicopter, an unmanned aerial vehicle (UAVs), a drone or any other technology that can capture high resolution images of geospatial areas from above the earth's surface. The image data can include HRA or VHR satellite imagery data or high resolution hyperspectral image data. The image data can include image data with a ground resolution of, for example, 10 cm to 5 m per pixel. The image data can include image data with a higher ground resolution such as, for example, less than 10 cm per pixel, or lower ground resolution such as, for example, greater than 5 m per pixel. The image data can include moving image data—that is, image data for a plurality of images of the target area TA captured over a period of time. The image data can include spatial, spectral, temporal, or radiometric image data. The image data can include panchromatic or monochromatic image data. The target area TA can have any shape, size, or elevation.

Figure 2:
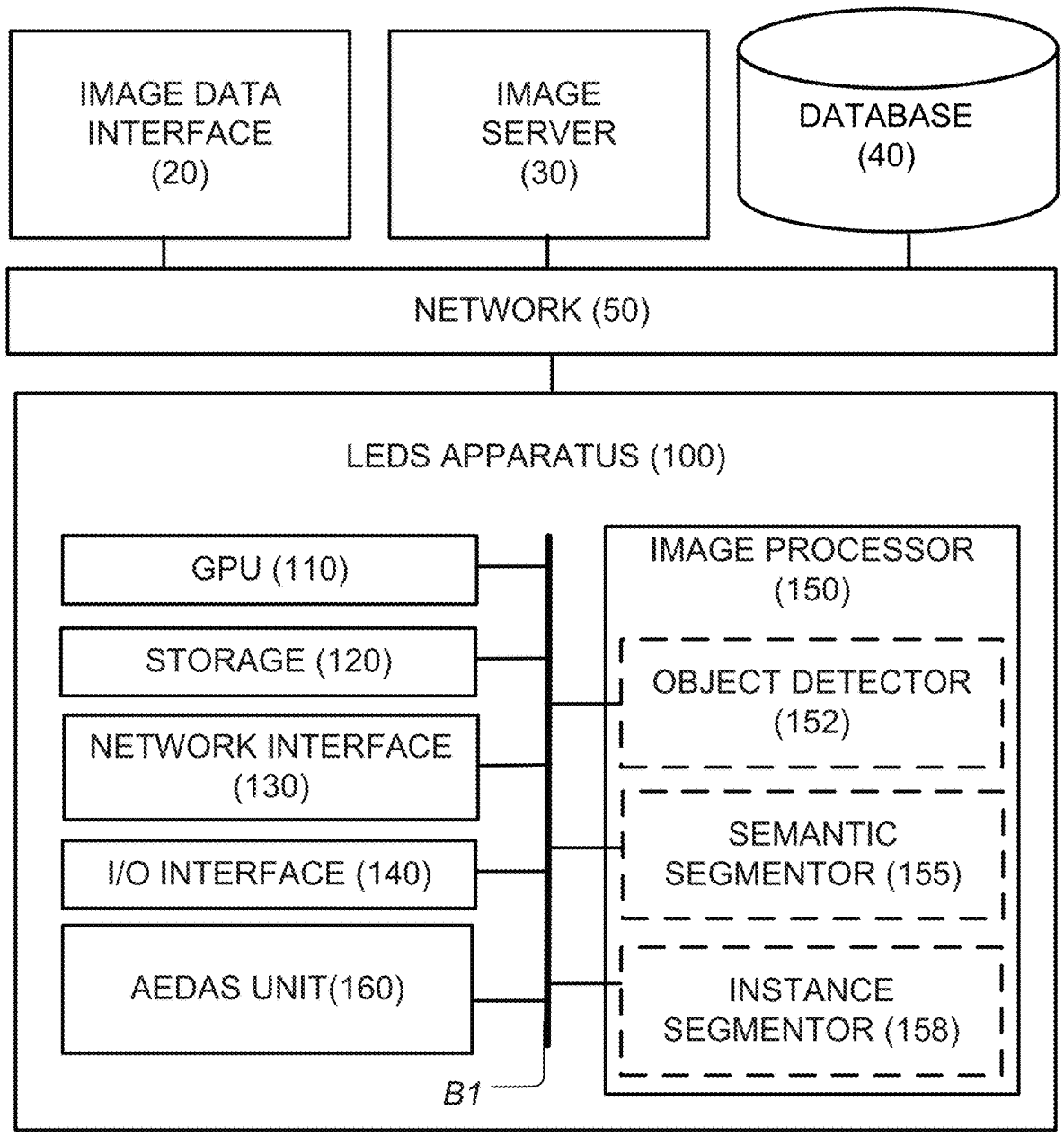
FIG. 2 shows an embodiment of a LEDS system, according to the principles of the disclosure.

FIG. 2 shows a non-limiting embodiment of the LEDS system 10, constructed according to the principles of the disclosure. The LEDS system 10 can include an image data interface 20, an image server 30, a database 40, and a LEDS apparatus 100. The LEDS system 10 can include a network 50, which can be connected to each of the components in the LEDS system 10 via one or more communication links. The LEDS system 10 can include a backbone (not shown) in addition to, or instead of the network 50.

The image data interface 20 can receive image data from the image server 30, the aerial image source 5, or any other source that can provide image data related to the target area TA (shown in FIG. 1), including, but not limited to, for example, sources having land asset data, sources having as-built drawing data, sources having approved future land use data, or sources having digitized temporary structure data. The image data can include image data that varies over time, such as, for example, a plurality of images of the geospatial target area TA (shown in FIG. 1) that are captured over a period of time. The image data can include live-streaming image data received from the aerial image source 5. The image data can include digital data packets containing image data and metadata.

The metadata can include, for example, geospatial coordinate data (e.g., latitude, longitude, elevation, or x-y-z Cartesian coordinates) that indicates the geospatial location of each pixel in an image represented by the image data, timestamp data that indicates the exact time at which the image was captured (e.g., Greenwich Mean Time (GMT) or Coordinated Universal Time (UTC)), and image source identification data that indicates the identify and location of the image source that captured the image, such as, for example, an identification of the aerial source 5 and its location when it captured the image. The metadata can be included in the image data received from the aerial image source 5 or the image server 30. The received image data can be forwarded from the image data interface 20 to the image server 30, either directly via a communication link, or via the network 50. The metadata associated with the image in the image data can be included and transmitted to the image server 30 together with the image data, or transmitted separately at the same or a different time.

The image server 30 can receive and store large amounts of image data, including associated metadata. The image server 30 can store geographic information system (GIS) data, including previously extract features of images of the target area TA, including objects in the target area. The image server 30 can store, for example, terabytes, petabytes, exabytes, zettabytes, yottabytes, or larger amounts of data. The image server 30 can receive and store object data that is associated with the image data. The image server 30 can include a database management system (DBMS) (not shown), file-based storage system or any storage medium which can receive and process queries in the LEDS system 10, including queries or requests related to image data, metadata, or object data. The image data, metadata or object data can be stored in the database 40.

The database 40 can include one or more relational databases. The database 40 can include image data and metadata for a plurality of geospatial areas, including the target area TA. The database 40 can include GIS data for each geospatial area. The database 40 can include object data for one or more objects in the target area TA. The object data can include object metadata, which can include geospatial coordinates for each of the one or more objects in the geospatial target area TA, time when the image(s) of the one or more objects were captured, and identification and location of the aerial image source 5 or the image capture device (not shown) that captured the image(s) of the object(s). The database 40 can include additional GIS data, such as, for example, geographic coordinates for the target area TA, weather conditions (e.g., temperature, air pressure, wind direction, wind speed), or any other information that might be useful in detecting land encroachment or surveillance in the target area TA, or any zones (e.g., PZ or CZ, shown in FIG. 1) in the target area. The database 40 can include object detection data, semantic segmentation data, and instance segmentation data for the target area TA and the objects in the area.

The LEDS apparatus 100 can include a graphic processor unit (GPU) 110, a storage 120, a network interface 130, an input-output (I/O) interface 140, an image processor 150, and an area encroachment detection and surveillance (AE-DAS) unit 160. The components in the LEDS apparatus 100 can be connected to a backbone B1 by means of one or more communication links. The LEDS apparatus 100 can be included in a server (not shown).

The GPU 110 can include any of various commercially available graphic processors, processors, microprocessors or multi-processor architectures. The GPU 110 can include a plurality of GPUs that can execute computer program instructions in parallel. The GPU 110 can include a central processing unit (CPU) or a plurality of CPUs arranged to function in parallel.

Figure 5:
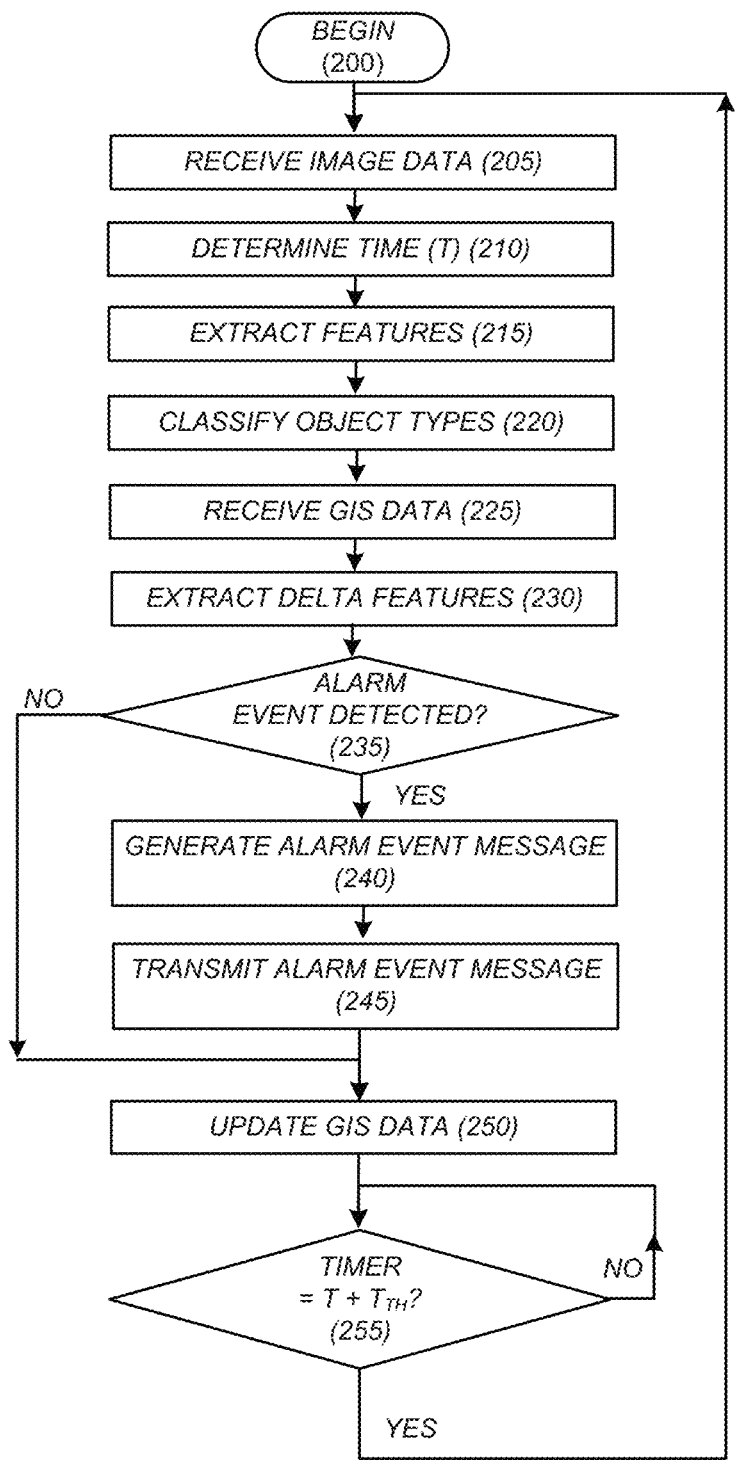
FIG. 5 shows an embodiment of a land encroachment and surveillance process that can be carried out by the LEDS system shown in FIG. 2.

The LEDS apparatus 100 can include a computer-readable medium that can hold executable or interpretable computer code (or instructions) that, when executed by the GPU 110, image processor 150, or AEDAS unit 160, cause the steps, processes and methods described in this disclosure to be carried out, including the area encroachment detection and surveillance process 200 (shown in FIG. 5). The computer-readable medium can be included in the storage 120, or an external computer-readable medium connected to the LEDS apparatus 100 via the network interface 130 or the I/O interface 140.

A basic input/output system (BIOS) can be stored in a non-volatile memory in the LEDS apparatus 100, such as, for example, in the storage 120. The BIOS can contain the basic routines that help to transfer information between computing resources within the LEDS apparatus 100, such as during start-up.

The storage 120 can include a read-only memory (ROM), an erasable programmable read-only memory (EPROM), an electrically erasable programmable read-only memory (EEPROM), a random-access memory (RAM), a non-volatile random-access memory (NVRAM), a burst buffer (BB), or any other device that can store digital data and computer executable instructions or code.

A variety of program modules can be stored in the storage 120, including an operating system (not shown), one or more application programs (not shown), application program interfaces (APIs) (not shown), program modules (not shown), or program data (not shown). Any (or all) of the operating system, application programs, APIs, program modules, or program data can be cached in the storage 120 as executable sections of computer code.

The network interface 130 can be connected to the network 50 or one or more external networks (not shown). The network interface 130 can include a wired or a wireless communication network interface (not shown) or a modem (not shown). When communicating in a local area network (LAN), the LEDS apparatus 100 can be connected to the LAN network through the wired or wireless communication network interface; and, when communicating in a wide area network (WAN), the LEDS apparatus 100 can be connected to the WAN network through the modem. The modem (not shown) can be internal or external and wired or wireless. The modem can be connected to the backbone B1 via, for example, a serial port interface (not shown).

The I/O interface 140 can receive commands and data from, for example, an operator via a user interface device (not shown), such as, for example, a keyboard (not shown), a mouse (not shown), a pointer (not shown), a microphone (not shown), a speaker (not shown), or a display (not shown). The received commands and data can be forwarded to the GPU 110, image processor 150, or AEDAS unit 160, from the I/O interface 140 as instruction and data signals via the backbone B1.

The network interface 130 can include a data parser (not shown) or the data parsing operation can be carried out by the GPU 110 or AEDAS unit 160. Received image data (with or without metadata) can be transferred from the network interface 130 to the GPU 110, the image processor 150, or the AEDAS unit 160. The network interface 130 can facilitate communication between any one or more of the components in the LEDS apparatus 100 and computing resources located internal (or external) to the network 50. The network interface 130 can handle a variety of communication or data packet formats or protocols, including conversion from one or more communication or data packet formats or protocols used by data sources (such as, for example, the aerial image source 5, image server 30, or database 40) to the communication or data packet formats or protocols used in the LEDS apparatus 100.

The image processor 150 can include a computing device or it can be included in a computing device as a module. The image processor 150 can include an object detector 152, a semantic segmentor 155, and an instance segmentor 158. The object detector 152, semantic segmentor 155, or instance segmentor 158 can each include a computing device or each can be included in a computing device as one or more modules. The image processor 150 can include a machine learning model such as, for example, an artificial neural network (ANN), a convolutional neural network (CNN), a deep CNN (DCNN), an RCNN, a Mask-RCNN, a deep convolutional encoder-decoder (DCED), a recurrent neural network (RNN), a neural Turing machine (NTM), a differential neural computer (DNC), a support vector machine (SVM), or a deep learning neural network (DLNN). The image processor 150 can analyze image data for the geospatial target area TA (shown in FIG. 1), detect one or more objects in the target area TA, classify and identify the one or more objects, and track and monitor the one or more objects over time, including the geographic position and geospatial orientation of each of the one or more objects as a function of time. The image processor 150 can analyze the image data and extract feature vector data. Alternatively, the image processor 150 can cause the GPU 110 to analyze the image data and extract feature vector data.

The image processor 150 can be initially trained using datasets such as, for example, a COCO (Common Objects in Context) dataset, a PASCAL VOC 2012 or newer dataset, or any other dataset that can be used to train a CNN, DCNN, or R-CNN and that might be relevant to the types of objects that could be found in the target area TA.

According to a non-limiting embodiment, the image processor 150 can include a CNN that is based on a proprietary platform or a readily available object detection and classification platform, such as, for example, the open source You-Only-Look-Once (YOLO) platform. The image processor 150 can detect, classify and track objects in near-real time in the geospatial target area TA (shown in FIG. 1). The image processor 150 can analyze every pixel in the received image data and make a prediction at every pixel. The image processor 150 can receive image data for the target area TA and format the image data into, for example, H×C×N pixel matrix data, where H is the number of rows of pixels in a pixel matrix, C is the number of columns of pixels in the pixel matrix, and N is the number of spectral channels (for example, R, G, B color channels) of pixel data. As noted above, the image data can include panchromatic, monochromatic, or hyperspectral HRA or VRH image data of the geospatial target area TA.

After formatting the received image data into N matrices of H×C pixels each, the image processor 150 can filter (or convolute) each pixel matrix using an a×b pixel grid filter matrix, where a and b are each equal to or greater than 1, but less than H or C, and where a and b can have the same values. The image processor 150 can slide and apply one or more a×b filter matrices (or grids) across all pixels in each H×C pixel matrix to compute dot products and detect patterns, creating convolved feature matrices having the same size as the a×b filter matrix. The image processor 150 can slide and apply multiple filter matrices to each H×C pixel matrix to extract a plurality of feature maps.

Once the feature maps are extracted, the feature maps can be moved to one or more rectified linear unit layers (ReLUs) in the CNN to locate the features. After the features are located, the rectified feature maps can be moved to one or more pooling layers to down-sample and reduce the dimensionality of each feature map. The down-sampled data can be output as multidimensional data arrays, such as, for example, a two-dimensional (2D) array or a three-dimensional (3D) array. The resultant multidimensional data arrays output from the pooling layers can be flattened (or converted) into single continuous linear vectors that can be forwarded to the fully connected layer (shown in FIG. 3B). The flattened matrices from the pooling layer can be fed as inputs to the fully connected neural network layer, which can auto-encode the feature data and classify the image data. As seen in FIG. 3B, the fully connected layer can include a plurality of hidden layers and an output layer.

The resultant image cells can predict the number of bounding boxes that might include an object, as well as confidence scores that indicate the likelihood that the bounding boxes might include the object. The image processor 150 can include bounding box classification, refinement and scoring based on the object(s) in the image represented by the image data. The image processor 150 can determine geospatial coordinate data (e.g., latitude, longitude, elevation, or x-y-z Cartesian coordinates) for the object and the bounding box, dimension data (height, width, depth) of the object and the bounding box, geospatial orientation data (e.g., angular position or attitude) of the object and bounding box, and probability data that indicates the likelihood that a given bounding box contains the object.

According to a non-limiting embodiment of the disclosure, the object detector 152 can include, or it can be included in the YOLO-based CNN to predict objects and determine bounding boxes, as described in the preceding paragraphs, with respect to the image processor 150. The CNN can range from a simple CNN having a minimal number of convolutional/pooling layers (e.g., 1 or 2 convolutional/pooling layers) and a single fully connected layer to a deep CNN (DCNN) having many convolutional/pooling layers (e.g., 10, 12, 14, 20, 26, or more layers) followed by multiple fully connected layers (e.g., two or more fully connected layers).

Figure 3A:
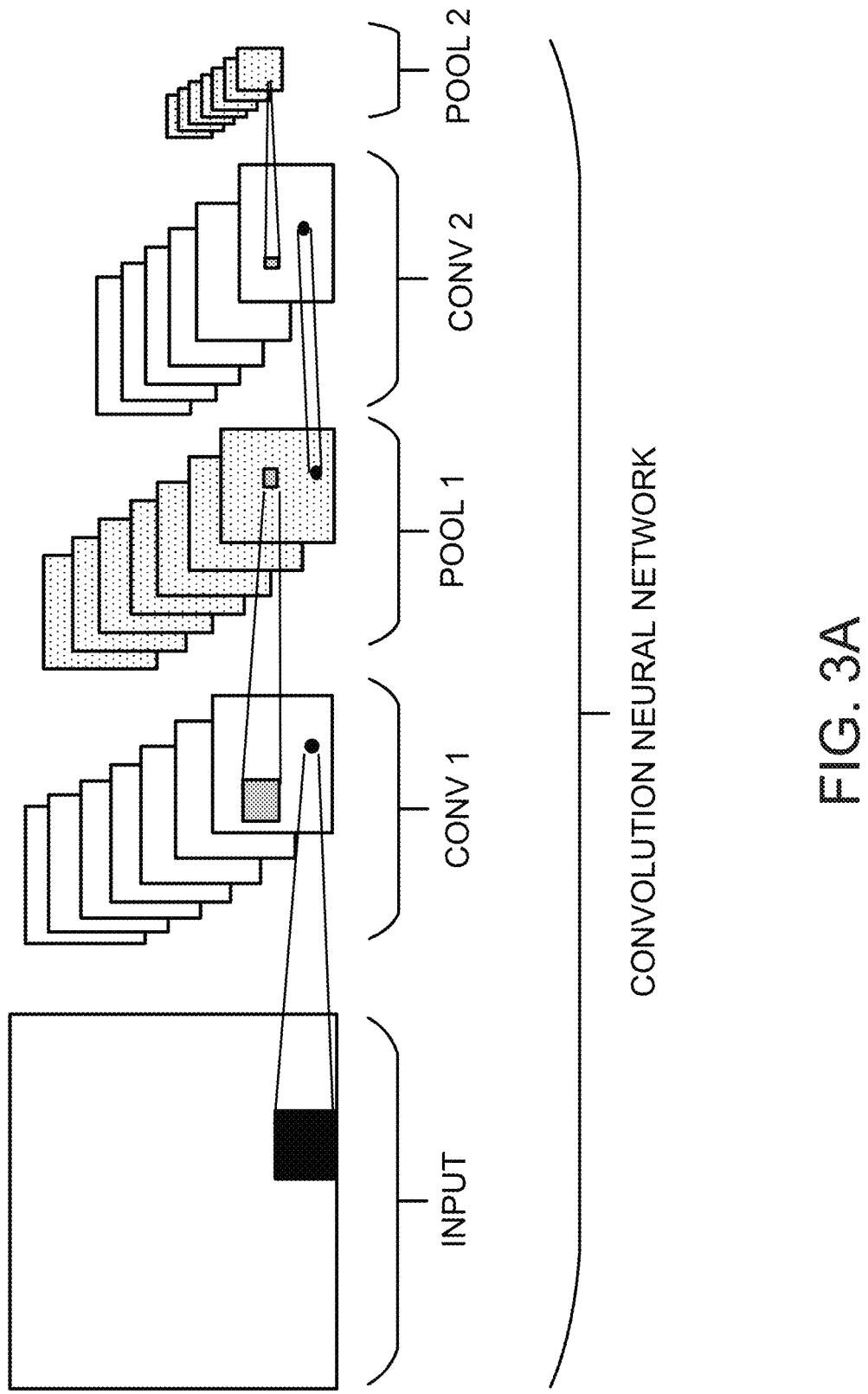
FIGS. 3A and 3B show an embodiment of a convolutional neural network (CNN) that can be included in the LEDS system in FIG. 2.
Figure 3B:
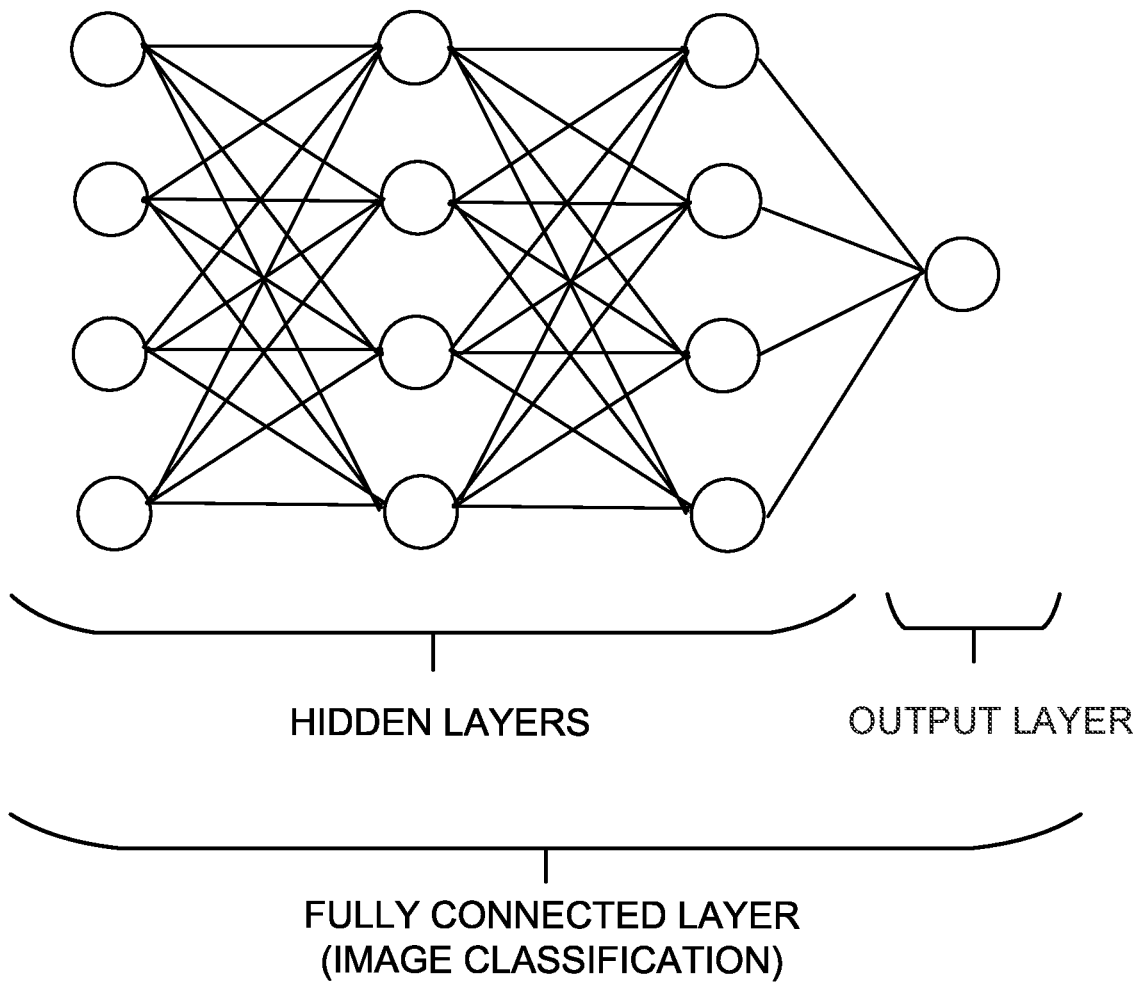

FIGS. 3A, 3B, show an example of a CNN that can be included in the image processor 150. The CNN can include a plurality of convolutional layers (e.g., CONV 1 and CONV 2), a plurality of rectified linear unit layers (ReLU, not shown), a plurality of pooling layers (e.g., POOL 1, POOL 2), and a fully connected layer. Each ReLU layer can be located between a convolution layer and a pooling layer. As seen in FIG. 3B, the fully connected layer can include a plurality of hidden layers and an output layer. Data can be flattened before it is transferred from the last pooling layer (e.g., POOL 2, shown in FIG. 3A) to the first hidden layer (shown in FIG. 3B) in the fully connected layer.

Referring to FIGS. 2, 3A, and 3B, the image processor 150 can format received image data such that, for example, H=996 pixels per row in each pixel matrix, C=996 pixels per column in each pixel matrix, and N=3 pixel matrices (red "R," green "G," and blue "B"), thereby providing about 0.99 megapixels per pixel matrix for a total of about 2.98 megapixels (i.e., 996×996×3=2.98 megapixels) for all three color channel (R, G, B) pixel matrices. Additional pixel matrices can be included where received image data includes infra-red (IR) image data, ultraviolet (UV) image data, radar image data, or other spectral band image data. Fewer pixel matrices can be included where the received image data includes monochromatic or bichromatic image data.

The filter matrix (or grid) can be set to, for example, 7×7 pixels, where a=b=7. One or more 7×7 filter matrices can be successively slid and applied across each H×C pixel matrix to compute dot products and locate features. After applying one or more convolutional/pooling layers to the image data, the resultant 2D data arrays output from the pooling layer can be flattened into a single continuous linear vector and forwarded to the fully connected layer (shown in FIG. 3B). The fully connected layer can auto-encode the feature data and classify the image data.

Using the CNN shown in FIGS. 3A, 3B, the image processor 150 can find, identify, classify, track and monitor objects in the geospatial target area TA, as well as any zones (e.g., PZ or CZ) in the target area TA (shown in FIG. 1). In this regard, the image processor 150 can divide the target area TA (including any zones) into discrete cells, determine bounding boxes, and predict objects in the bounding boxes. The image processor 150 can analyze image data for the target area TA in near-real time by, for example, analyzing real-time video feed data received (directly or indirectly) from the aerial image source 5 (shown in FIG. 1).

The semantic segmentor 155 can associate each pixel in the image data of an image of the target area TA with a classification label, such as, for example, the type of object. According to a non-limiting embodiment of the disclosure, the semantic segmentor 155 can include, encoder-decoder based Convolutional/Deconvolutional networks for object classification. The type of object can include a descriptive identification of, for example, a landform, a land formations, a structure, a building, a pipeline, a roadway, a bridge, a railway track, a vehicle, a vessel, an aircraft, a watercraft, equipment, a machine, supplies, a material, a person, an animal, or a description of any other naturally occurring or manufactured article that can be located in the geospatial target area TA (shown in FIG. 1). According to a non-limiting embodiment of the disclosure, the semantic segmentor 155 can be used in, for example, a geographic information system (GIS) application for land cover classification or to extract unique features such as, for example, road networks, gas stations, asphalt roads, farms, camps or any other objects in the target area TA. The semantic segmentor 155 can recognize and classify what is captured in each pixel of the image data for the target area TA, including all objects in the target area TA.

The instance segmentor 158 can include an instance segmentation model such as, for example, Mask-RCNN, which can include an object detection methodology that can mark out each object instance in the image data. According to a non-limiting embodiment of the disclosure, the instance segmentor 158 can include, or be included in the CNN. The instance segmentor 158 can detect and delineate each distinct object of interest appearing in the target area TA. The instance segmentor 158 can label each pixel with object and instance information. This can be useful for tasks such as, for example, improving base maps by adding building footprints, and for creating building footprints without any need of manual digitizing. The instance segmentor 158 can include classification noise reduction within each segment to better detect and identify real-world objects.

The AEDAS unit 160 can include a computing device or it can be included in a computing device as one or more modules. The AEDAS unit 160 can include a machine learning model such as, for example, an ANN, CNN, DCNN, RCNN, NTM, DNC, SVM, or DLNN. The AEDAS unit 160 can transmit instructions and data to, and receive instructions and data from the other components in the LEDS apparatus 100, including the GPU 110 and image processor 150.

The AED AS unit 160 can transmit instructions or data to, or receive instructions or data from the communicating device ("CD") 15 (shown in FIG. 1) via the network interface 130 or I/O interface 140. The transmitted instructions or data can be received by the communicating device 15 and used to generate a graphic user interface (GUI) (not shown) on a display of the communicating device 15. The instructions and data received by the AEDAS unit 160 can include alarm configuration data received from the communicating device 15. According to a non-limiting embodiment, the alarm configuration data can be entered into the GUI by a user via a user interface (UI) such as, for example, a keyboard, a touch-screen display, a mouse, or any other device capable of entering data and instruction to the communicating device 15. According to an alternative embodiment, the image processor 150 can be trained using GIS datasets to self-configure alarm configurations, without any user input.

The alarm configuration data can include, for example, geographic coordinate data for the target area TA (shown in FIG. 1), alarm event data, and notification data. The geographic coordinate data can include the geographic coordinates of the perimeter of the target area TA. The alarm event data can include one or more policies or rules for determining an alarm event. An alarm event can include, for example, movement of an object, absence of an object, existence of an object, location of an object, or alteration of an object. An alarm event can be indicative of theft, vandalism, trespass, or other act affecting an object or the target area TA.

The notification data can include one or more polices or rules for transmitting an alarm notification, including an Internet protocol (IP) address of a destination communicating device (e.g., communicating device 15, shown in FIG. 1), a telephone number of the destination communicating device, or any other information that can be used by the LEDS apparatus 100 (shown in FIG. 2) to generate and transmit the alarm notification to the destination communicating device, including, in most instances across a distributed network to a terrestrial destination comprising at least one such communicating device.

The AEDAS unit 160 can receive object detection data, semantic segmentation data, and instance segmentation data from the image processor 150. The object detection data can include, for example, an identification of each object or bounding box in the target area TA, geospatial coordinate data (e.g., latitude, longitude, elevation, or x-y-z Cartesian coordinates) for each object or bounding box, orientation (e.g., angular position or attitude) for each object or bounding box, or dimension data (e.g., height, width, depth) for each object or bounding box. The object detection data can include probability data for each bounding box, indicating a likelihood that a given bounding box contains a particular object. The semantic segmentation data can include an object classification for each pixel in the image data for the target area TA. The instance segmentation data can include object and instance information for each pixel in the image data for the target area TA.

The AEDAS unit 160 can communicate with the image processor 150, which can identify and classify objects in the geospatial target area and identify any changes to the location, position (e.g., orientation or direction), structure, size, shape or appearance of the objects to determine land encroachments or other alarm events. Any changes to the objects or target area TA can be identified by, for example, the CNN in the image processor 150 and an alarm event generated by the AEDAS unit 160. The alarm event can include an indication that an object in the target area is, for example, missing, stolen, damaged, or relocated, or that the object (e.g., a person) has encroached in the target area TA. The alarm event conditions can vary depending on the zone in the target area TA, such as, for example, with stricter conditions being applied for critical zone CZ than for the permissive zone PZ in the target area TA (shown in FIG. 1).

If the AEDAS unit 160 determines an alarm event, the AEDAS unit 160 can generate an alarm event message and, via the network interface 130 or I/O interface 140, transmit the alarm event message to the communicating device (CD) 15 (shown in FIG. 1). The alarm event message can be transmitted, for example, in an email, a short message service (SMS) message, a synthesized voice message, or any other type of transmission medium that can communicate the alarm event message.

Figure 4:
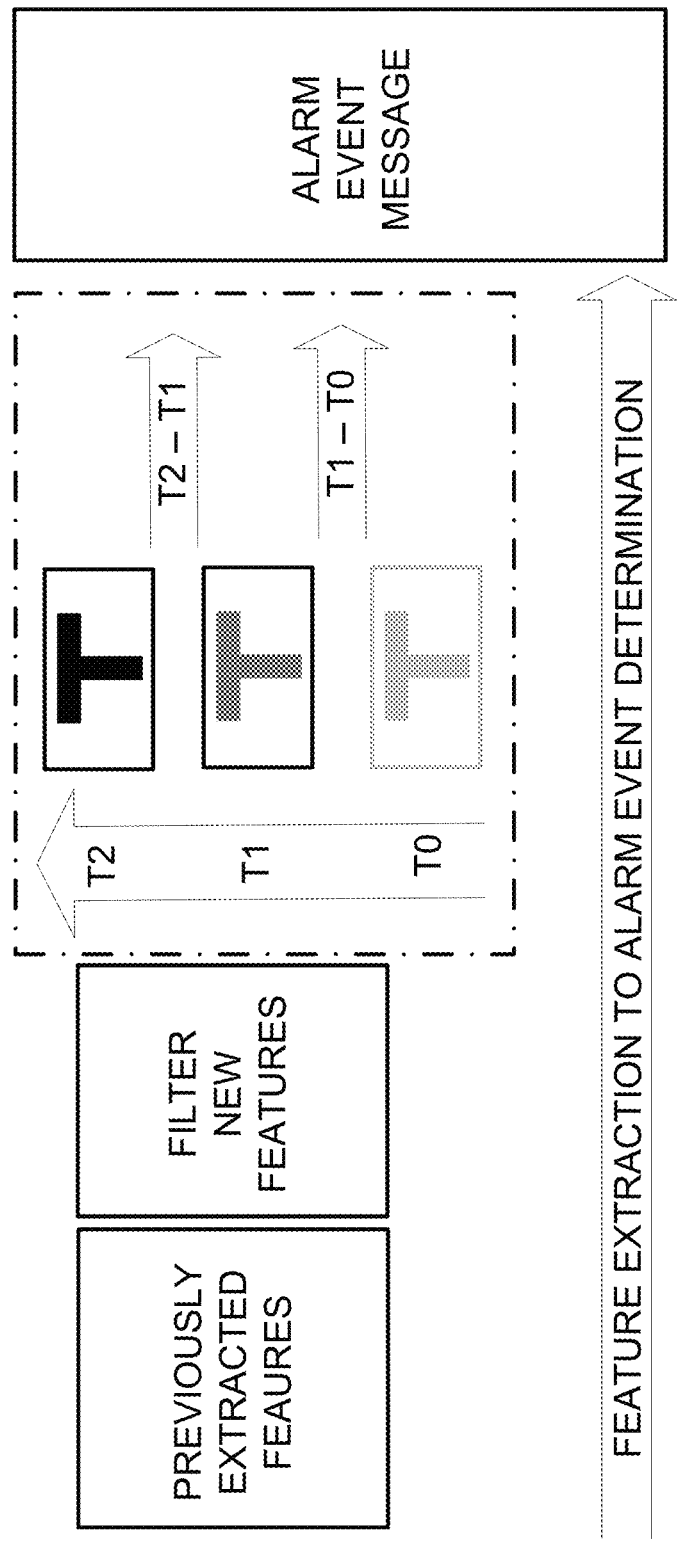
FIG. 4 shows an example of a workflow of the LEDS system shown in FIG. 2.

FIG. 4 shows an example of a work flow for the LEDS apparatus 100. As seen, the LEDS apparatus 100 can receive previously extracted features for the target area TA (shown in FIG. 1) at times T0 and T1, and extract new features for the target area TA at time T3 by filtering (in the image processor 150) the newly received image data for time T3. The LEDS apparatus 100 can compare the extracted features for times T1 and T0, and the extracted features for times T2 and T1, and, based on the results of the comparisons (e.g., delta features between T2 and T1 and delta features between T1 and T0), the LEDS apparatus 100 can determine whether an alarm event has occurred and whether to transmit an alarm event message.

FIG. 5 shows an embodiment of a land encroachment and surveillance process 200 that can be carried out by the LEDS apparatus 100 (shown in FIG. 2). Referring to FIGS. 2 and 5, the process 200 can begin with the LEDS apparatus 100 receiving image data for a target area TA (shown in FIG. 1) (Step 205). The image data can be received by the LEDS apparatus 100 via the network interface 130 or I/O interface 140. The received image data can include real time image data received from the image data interface 20 or previously stored image data received from the image server 30. The image data interface 20 can receive one or more live video feeds from the aerial source 5 (shown in FIG. 1) and forward the received real time image data to the LEDS apparatus 100 via, for example, the network 50. The image data interface 20 can forward the received real time image data to the image server 30, either directly or over the network 50, for storage in the database 40 or locally in the image server 30.

At the LEDS apparatus 100, the received image data can be parsed by, for example, the GPU 110 to separate the image data into image data packets and associated metadata, including time stamp data that indicates the time T the image in the image data was captured by, for example, the aerial image source 5 (Step 210). The image data can be formatted and features extracted by the CNN in the image processor 150 (Step 215). The image processor 150 can, by operation of the CNN, classify each object in the image data with an object type (Step 220).

The image processor 150 can compare the features extracted from the received image data (extracted at Step 215) with associated object feature data in the GIS dataset (received at Step 225) and extract any delta features (Step 230). The delta features can include any differences between the features extracted from the image data received at Step 205 and the GIS data set received at Step 225. Based on the delta features, the image processor 150 can determine whether an alarm event has occurred (Step 235). For instance, the image processor 150 can determine an alarm event where an object has been moved, removed, or damaged, or an object has encroached into the target area TA.

According to a non-limiting embodiment, the GIS dataset can be accessed in the storage 120 or received from the image server 130 and stored in the storage 120, where it can be accessed by the image processor 150. The GIS data can include object detection data, semantic segmentation data, instance segmentation data, geographic coordinate data, orientation data, or any other information that can be used by the image processor 150 to determine an alarm event. The GIS data can include the latest modelling parameters, which can be used in the image processor 150 to predict objects in the target area TA. The GIS data can include historical image data for the geospatial target area TA, including captured images of objects in the target area TA over an extended period of time (e.g., minutes, hours, days, weeks, months, or years). The GIS data can include a training dataset for image processor 150.

If an alarm event is determined by the image processor 150 (YES at Step 235), then the AEDAS unit 160 can generate an alarm event message (Step 240) and, via the network interface 130 or I/O interface 140, transmit the alarm event message to the communicating device (e.g., CD 15, shown in FIG. 1) (Step 245). The GIS data can be updated with the features extracted at Step 215, classifications determined at Step 220 and delta features determined at Step 230 (Step 250).

If an alarm event is not determined by the image processor 150 (NO at Step 235), then the GIS data can be updated with the features extracted at Step 215, classifications determined at Step 220 and delta features determined at Step 230 (Step 250).

The LEDS apparatus 100 can wait for a threshold time $T_{TH}$ to pass (NO at Step 255) and when the threshold time $T_{TH}$ passes (YES at Step 255), the process 200 can repeat for the next instance of image data for the target area TA (Step 205).

According to a non-limiting application of the LEDS system 100 (shown in FIG. 2), a deep learning neural network can be utilized to extract features in satellite images, classify the extracted features according to their types, and compare extracted features with previously seen object features to identify any new objects added to a geospatial area. The LEDS system 100 can categorize the objects or changes to the objects as legitimate or non-legitimate by determining whether they fall within a permitted operation area. The LEDS system 100 can categorized the objects or changes to the objects as critical or non-critical according to their location in accordance with identified hot spot zones and critical facilities. The LEDS system 100 can also determine whether any objects are missing or damaged and reconcile the determination results with any legitimate removal or alterations of objects within a pre-defined area of interest.

The terms "a," "an," and "the," as used in this disclosure, means "one or more," unless expressly specified otherwise.

The term "backbone," as used in this disclosure, means a transmission medium that interconnects one or more computing resources to provide a path that conveys data signals and instruction signals between the one or more computing resources. The backbone can include a bus or a network. The backbone can include an ethernet TCP/IP. The backbone can include a distributed backbone, a collapsed backbone, a parallel backbone or a serial backbone. The backbone can include any of several types of bus structures that can further interconnect to a memory bus (with or without a memory controller), a peripheral bus, and a local bus using any of a variety of commercially available bus architectures.

The term "communicating device," as used in this disclosure, means any hardware, firmware, or software that can transmit or receive data packets, instruction signals, data signals or radio frequency signals over a communication link. The communicating device can include a computer or a server. The communicating device can be portable or stationary.

The term "communication link," as used in this disclosure, means a wired or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, WiFi, WiMAX, IEEE 802.11, DECT, 0G, 1G, 2G, 3G, 4G, or 5G cellular standards, or Bluetooth. A communication link can include, for example, an RS-232, RS-422, RS-485, or any other suitable serial interface.

The terms "computer" or "computing device," as used in this disclosure, means any machine, device, circuit, component, or module, or any system of machines, devices, circuits, components, or modules which are capable of manipulating data according to one or more instructions, such as, for example, without limitation, a processor, a microprocessor, a graphics processing unit, a central processing unit, a general purpose computer, a super computer, a personal computer, a laptop computer, a palmtop computer, a notebook computer, a desktop computer, a workstation computer, a server, a server farm, a computer cloud, or an array of processors, microprocessors, central processing units, general purpose computers, super computers, personal computers, laptop computers, palmtop computers, notebook computers, desktop computers, workstation computers, or servers.

The term "computer-readable medium," as used in this disclosure, means any storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read. The computer-readable medium can include a "Cloud," which includes a distribution of files across multiple (for example, thousands of) memory caches on multiple (for example, thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards or protocols, including, for example, WiFi, WiMAX, IEEE 802.11, DECT, 0G, 1G, 2G, 3G, 4G, or 5G cellular standards, or Bluetooth.

The term "database," as used in this disclosure, means any combination of software or hardware, including at least one application or at least one computer. The database can include a structured collection of records or data organized according to a database model, such as, for example, but not limited to at least one of a relational model, a hierarchical model, or a network model. The database can include a database management system application (DBMS) as is known in the art. The at least one application may include, but is not limited to, for example, an application program that can accept connections to service requests from clients by sending back responses to the clients. The database can be configured to run the at least one application, often under heavy workloads, unattended, for extended periods of time with minimal human direction.

The terms "including," "comprising" and their variations, as used in this disclosure, mean "including, but not limited to," unless expressly specified otherwise.

The term "network," as used in this disclosure means, but is not limited to, for example, at least one of a local area network (LAN), a wide area network (WAN), a metropolitan area network (MAN), a personal area network (PAN), a campus area network, a corporate area network, a global area network (GAN), a broadband area network (BAN), a cellular network, or the Internet, any of which can be configured to communicate data via a wireless or a wired communication medium. These networks can run a variety of protocols not limited to TCP/IP, IRC or HTTP.

The term "server," as used in this disclosure, means any combination of software or hardware, including at least one application or at least one computer to perform services for connected clients as part of a client-server architecture, server-server architecture or client-client architecture. A server can include a mainframe or a server cloud or server farm. The at least one server application can include, but is not limited to, for example, an application program that can accept connections to service requests from clients by sending back responses to the clients. The server can be configured to run the at least one application, often under heavy workloads, unattended, for extended periods of time with minimal human direction. The server can include a plurality of computers configured, with the at least one application being divided among the computers depending upon the workload. For example, under light loading, the at least one application can run on a single computer. However, under heavy loading, multiple computers can be required to run the at least one application. The server, or any if its computers, can also be used as a workstation.

The terms "transmission," "transmit," "communication," "communicate," "connection," or "connect," as used in this disclosure, include the conveyance of data, data packets, computer instructions, or any other digital or analog information via electricity, acoustic waves, light waves or other electromagnetic emissions, such as those generated with communications in the radio frequency (RF), or infrared (IR) spectra. Transmission media for such transmissions can include subatomic particles, atomic particles, molecules (in gas, liquid, or solid form), space, or physical articles such as, for example, coaxial cables, copper wire and fiber optics, including the wires that comprise a system bus coupled to the processor.

Devices that are in communication with each other need not be in continuous communication with each other unless expressly specified otherwise. In addition, devices that are in communication with each other may communicate directly or indirectly through one or more intermediaries.

Although process steps, method steps, or algorithms may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described in this specification may be performed in any order practical. In certain non-limiting embodiments, one or more process steps, method steps, or algorithms can be omitted or skipped.

When a single device or article is described, it will be readily apparent that more than one device or article may be used in place of a single device or article. Similarly, where more than one device or article is described, it will be readily apparent that a single device or article may be used in place of the more than one device or article. The functionality or the features of a device may be alternatively embodied by one or more other devices which are not explicitly described as having such functionality or features.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications, or modifications of the disclosure.

What is claimed is:

1. A method for surveillance and area encroachment detection, the method comprising:
    receiving satellite image data containing an image of a geospatial area, the geospatial area comprising at least one critical zone and at least one permissive zone;
    extracting features from the satellite image data of an object in the image;
    classifying the object in the image based on the extracted features;
    comparing the extracted features of the object to previously extracted features for the geospatial area;
    determining delta features between the extracted features of the object and the previously extracted features for the geospatial area;
    determining existence of an alarm event in the geospatial area based on the delta features, the existence of the alarm event being determined when at least a portion of the delta features is located in the at least one critical zone; and
    transmitting an alarm event message to a communicating device when the existence of the alarm event is determined,
    wherein the alarm event determining determines a non-existence of the alarm event when the delta features are located in the at least one permissive zone.

2. The method in claim 1, wherein the alarm event comprises an encroachment in the geospatial area.

3. The method in claim 1, wherein the alarm event comprises an encroachment in a zone in the geospatial area.

4. The method in claim 1, wherein the alarm event comprises adding or appearance of the object in the geospatial area.

5. The method in claim 1, wherein the alarm event comprises removal of the object from the geospatial area.

6. The method in claim 1, wherein the alarm event comprises a change to an attribute of the object.

7. The method in claim 1, further comprising receiving the previously extracted features for the geospatial area from a storage unit containing geographic information system data.

8. The method in claim 1, further comprising:
    receiving a training dataset for the geospatial area; and
    supplying the training dataset to a deep learning neural network to train the deep learning neural network to determine the existence of the object in the geospatial area.

9. A non-transitory computer readable storage medium storing surveillance and area encroachment detection program instructions for causing an area encroachment detection and surveillance apparatus to analyze satellite image data and detect an alarm event, the program instructions comprising the steps of:
    receiving satellite image data containing an image of a geospatial area, the geospatial area comprising at least one critical zone and at least one permissive zone;

extracting features from the satellite image data of an object in the image;

classifying the object in the image based on the extracted features;

comparing the extracted features of the object to previously extracted features for the geospatial area;

determining delta features between the extracted features of the object and the previously extracted features for the geospatial area;

determining existence of an alarm event in the geospatial area based on the delta features, the existence of the alarm event being determined when at least a portion of the delta features is located in the at least one critical zone; and transmitting an alarm event message to a communicating device when the existence of the alarm event is determined, wherein the alarm event determining determines a nonexistence of the alarm event when the delta features are located in the at least one permissive zone.

10. The non-transitory computer readable storage medium in claim 9, the program instructions comprising the further step of:

receiving a training dataset for the geospatial area; and supplying the training dataset to a deep learning neural network to train the deep learning neural network to determine the existence of the alarm event in the geospatial area.

11. The non-transitory computer readable storage medium in claim 9, wherein the alarm event comprises an encroachment in the geospatial area.

12. The non-transitory computer readable storage medium in claim 9, wherein the alarm event comprises an introduction or appearance of an object in the geospatial area.

13. The non-transitory computer readable storage medium in claim 9, wherein the alarm event comprises change in the attributes of an object in the geospatial area.

14. The non-transitory computer readable storage medium in claim 9, wherein the alarm event comprises an encroachment in a zone in the geospatial area.

15. The non-transitory computer readable storage medium in claim 9, wherein the alarm event comprises removal of the object from the geospatial area.

16. The non-transitory computer readable storage medium in claim 9, the program instructions further comprising the step of receiving the previously extracted features for the geospatial area from a storage containing geographic information system data.

17. A surveillance and area encroachment detection system, the system comprising:

an image data interface that receives, via a communication link to an image data source, satellite image data for an image of a geospatial area, the geospatial area comprising at least one critical zone and at least one permissive zone;

an image processor having a deep neural network that extracts features from the satellite image data of an object in the image, classifies the object in the image based on the extracted features, compares the extracted features of the object to previously extracted features for the geospatial area, determines delta features between the extracted features of the object and the previously extracted features for the geospatial area, and detects an alarm event in the geospatial area based on the delta features, the alarm event being detected when at least a portion of the delta features is located in the at least one critical zone; and area encroachment detection and surveillance unit that transmits an alarm event message to a communicating device based on the detected alarm event, wherein the image processor determines a nonexistence of the alarm event when the delta features are located in the at least one permissive zone.

18. The system in claim 17, wherein the image processor comprises an object detector, a semantic segmentor, and an instance segmentor to compare extracted objects and their attributes at different times.

19. The system in claim 18, wherein the object detector predicts the object in the geospatial area.

20. The system in claim 18, wherein the object detector determines a bounding box and a probability score that the bounding box includes the object.

21. The system in claim 18, wherein the semantic segmentor associates each pixel in the satellite image data with a classification label.

22. The system in claim 18, wherein the instance segmentor comprises a Mask-RCNN.

23. The system in claim 18, wherein the instance segmentor marks out each object instance in the satellite image data.

* * * * *